F. ACKERMAN.
FISHING BAIT.
APPLICATION FILED MAY 13, 1920.
1,362,586.
Patented Dec. 21, 1920.
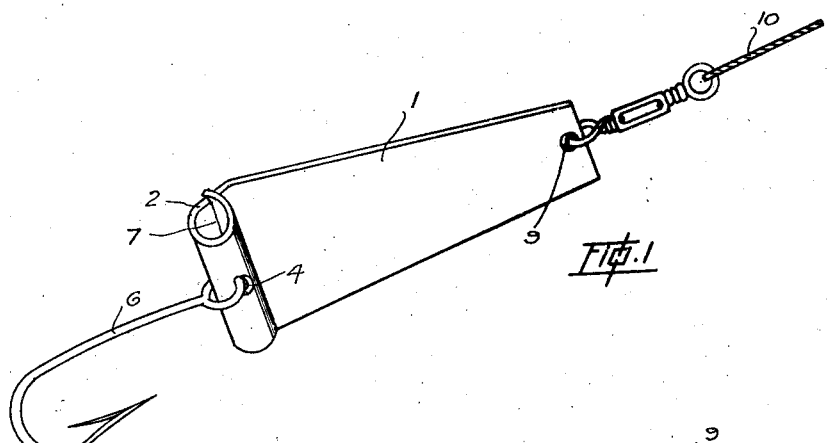
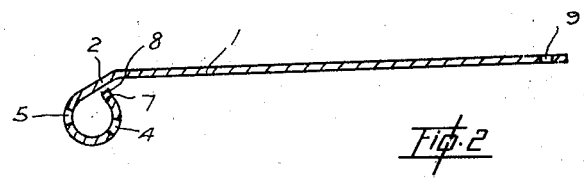
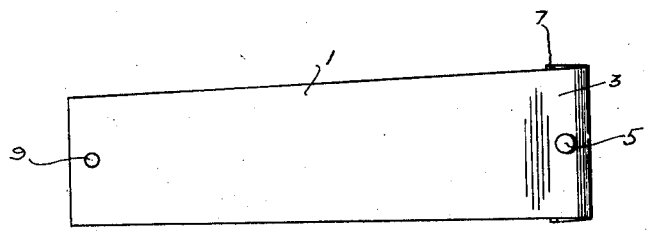
Inventor.
Fred. Ackerman.

UNITED STATES PATENT OFFICE.

FRED ACKERMAN, OF VANCOUVER, BRITISH COLUMBIA, CANADA.

FISHING-BAIT.

1,362,586.   Specification of Letters Patent.   Patented Dec. 21, 1920.

Application filed May 13, 1920. Serial No. 381,144.

*To all whom it may concern:*

Be it known that I, FRED ACKERMAN, a citizen of the United States, and a resident of the city of Vancouver, in the Province of British Columbia, Canada, have invented certain now and useful Improvements in Fishing-Baits, of which the following is a specification.

My invention relates to improvements in fishing-baits, and the object of my invention is to provide an artificial spoon bait for use in trolling for salmon and other kinds of fish, the construction of which is such that it will not flop or turn over but will remain on edge while in use, and which is simple, inexpensive, and of great efficiency.

I attain this object by the construction illustrated in the accompanying drawings.

Figure 1 is a perspective view of the bait.

Fig. 2 is a longitudinal sectional view taken through the center line.

Fig. 3 is a side view looking on the opposite side of Fig. 1.

Similar figures of reference indicate similar parts throughout the several views.

1 indicates the spoon portion of the bait which may be made in any size and used for any kind of fish. It is formed out of one piece of metal plate, preferably wider at one end than the other and at the wide end the plate is bent at an angle, as indicated at 2 in Fig. 1, and then rolled over on itself to form a tube 3 provided with holes 4 and 5 to which the hook may be attached. The end edge 7 of the turned over portion is spaced slightly apart from the plate as at 8 so as to leave the tube joint open, and is of greater length than the width of the plate so that the tubular portion is slightly wider than the plate body. The opposite end of the plate is provided with a hole 9 for the attachment of the trolling line 10.

The bait is used in the same manner as other spoon baits, being attached to the line 10 and drawn through the water at a suitable speed. The water entering the tubular end 3 forms within the tube a column of water which effectually prevents the plate 1 from turning over and thus eliminates a defect common to many spoons in use at the present time, namely, the tendency to flop and turn over which defect destroys the efficiency of the bait.

What I claim as my invention is:

1. A fishing bait comprising a flat metal plate provided at one end with a transversely extending tubular portion offset to one side of the plate forming a transverse water passage.

2. A fishing bait comprising a flat metal plate apertured at one end for attachment to a fishing line and having the opposite end thereof offset to one side of the plate and rolled into tubular form with the rolled end slightly spaced from the body of the plate to provide an intervening water passage.

3. A fishing bait comprising a plate apertured at one end for attachment to a fishing line and provided at the opposite end with a transversely extending tubular portion offset to one side of the plate, said tubular portion being formed with a longitudinal water inlet passage communicating with the hollow interior thereof and with oppositely arranged side openings, the latter being alined to permit of the attachment of a fish hook thereto.

Signed at Vancouver, B. C., Canada, this 29th day of April, 1920.

FRED ACKERMAN.